UNITED STATES PATENT OFFICE.

GEORGE H. WIDNER, OF DES MOINES, IOWA, ASSIGNOR TO DES MOINES REFINING COMPANY, OF DES MOINES, IOWA, A CORPORATION OF IOWA.

PROCESS FOR PRODUCING A WATER-SOFTENER.

1,207,826.     Specification of Letters Patent.     Patented Dec. 12, 1916.

No Drawing. Original application filed May 20, 1916, Serial No. 98,993. Divided and this application filed August 10, 1916. Serial No. 114,258.

*To all whom it may concern:*

Be it known that I, GEORGE H. WIDNER, a citizen of the United States, residing at Des Moines, in the county of Polk and State of Iowa, have invented certain new and useful Improvements in Processes for Producing a Water-Softener, of which the following is a specification.

This invention relates to a process for treating a natural zeolite-like substance to render it useful as a water softener, and this application is a division of my co-pending application 98,993 filed May 20, 1916.

In carrying out the invention a mineral which has for its base a hydrated silicate of aluminum containing a small amount of impurities and some moisture is dried at a low temperature until all free moisture is removed after which the material is reduced to suitable size by mechanical means. The material is then baked at a high temperature in an oven or furnace until a sample shows said mineral to be hard enough to resist the powdering action of water but the temperature employed in not high enough to fuse the mineral. The mineral is then dumped into a vat of salt water and stored there. I find that the desired results may likewise be secured by drying and reducing to suitable size as above set forth and then mixing the material with salt before baking at high temperature. In this latter case the temperature employed is not high enough to cause fusing of the mineral but the baking is carried on until a sample shows that the mineral is hard enough to resist the powdering action of water. The mineral is then dumped into a vat of water and stored there.

The above described treatment of the material renders it granular and porous particularly adapting it for the purpose for which it is designed while, at the same time, rendering it of such a nature that it will not be reduced to a pasty mass under the action of the water.

When the product produced by the above described process has absorbed as much calcium as it is capable of absorbing, it may be restored or renewed by passing salt water through the mass of material. Since the calcium taken up may be thus removed and since the treatment given the material renders it non-reducible under the action of the water, it follows that the life of the material is very great.

Having described my invention what I claim is:—

1. The herein described process which consists of treating a mineral having for its base a hydrated silicate of aluminum by first drying said mineral to remove all free moisture then reducing said mineral to suitable size by mechanical means then adding salt to said mineral, then baking said mineral without fusing the same until it is hard enough to resist the powdering action of water.

2. The herein described process which consists of treating a mineral having for its base a hydrated silicate of aluminum by first drying said mineral to remove all free moisture, then reducing said mineral to suitable size by mechanical means, then adding salt to said mineral, then baking said mineral without fusing the same until it is hard enough to resist the powdering action of water and then storing said mineral in water.

In testimony whereof I affix my signature in the presence of two witnesses.

GEORGE H. WIDNER.

Witnesses:
   GEORGE W. PRATHER,
   E. E. MOORE.